May 30, 1944.  F. S. SANDER  2,349,991
CONNECTING CLAMP
Filed May 28, 1943
Fig:1.
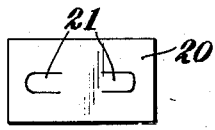
Fig:5.
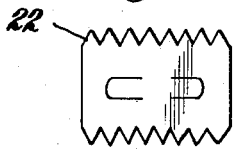
Fig:2.
Fig:6.
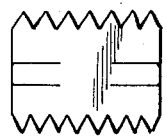
Fig:3.
Fig:7.
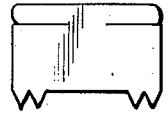
Fig:4.
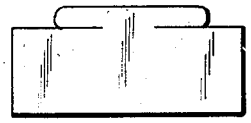
Fig:8.
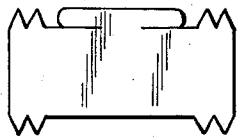
Fig:10.
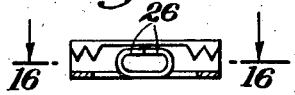
Fig:13.
Fig:9.
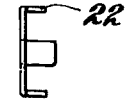
Fig:11.
Fig:14.
Fig:16.
Fig:12.
Fig:15.
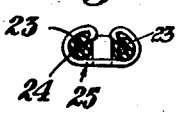
Fig:17.
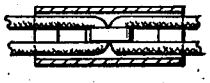
INVENTOR.
FRANK S. SANDER Patented May 30, 1944

2,349,991

UNITED STATES PATENT OFFICE 2,349,991

CONNECTING CLAMP

Frank S. Sander, New York, N. Y.

Application May 28, 1943, Serial No. 488,827

12 Claims. (Cl. 287—76)

My present invention relates to connecting clamps and more particularly to clamps for connecting wire loops.

It is an object of my present invention to construct connecting means for wire loops in such a manner that sliding out of the connected wire loops from these connecting means is efficiently prevented.

It is a further object of my present invention to provide combined connecting and clamping means for wire loops adapted to securely connect the tips of two wire loops with each other and simultaneously to prevent relative movement of the thus connected loops.

It is still a further object of the present invention to manufacture connecting means of the above described type in an extremely simple way by bending the connecting and clamping parts out of one piece of sheet metal plate.

With the above objects in view my present invention mainly consists in a connecting clamp which comprises a connecting sleeve with openings at both ends through which the wire loops to be connected may be introduced into the sleeve in such a manner that the loop tips are facing each other, and projections on this sleeve bend inward into the same so as to hook into the wire loops to be connected. Thus these projections are holding the wire loops within the sleeve and prevent them from sliding out of the same after these wire loops are introduced into this sleeve and arranged within the same with the loop tips facing each other.

I prefer to use for the connecting sleeve sheet metal and to stamp out of this sheet metal portions which might be bent into the shape of hooks engaging the corresponding wire loops.

These hook shaped projections may be arranged at various distances from each other: thus for instance it is possible to arrange them near to each other so that their end portions overlap. It is also possible to arrange these hooks at such a distance that there remains between them free space enabling introduction of the wire loops into the finished hooks.

I have furthermore found that very good results are obtained if the hooks are arranged in such a manner that they hold the wire loops with the loop tips contacting each other. For this purpose the hooks have to be arranged at a distance from each other which is equal or slightly greater than twice the diameter of the wire forming the wire loops to be connected.

If it is desired to connect the wire loops unturnably with each other then it is advisable to use fabric and/or rubber covered wires. In this case additional projections should be provided along the longitudinal edges of the sheet metal plate of which the connecting sleeve consists. These projections are gripping into the fabric and/or rubber covering of the wires when the same are arranged with the loop tips facing each other within the sleeve. It is evident that in this position also the hook shaped projections are hooking in these wire loops thereby preventing sliding out of the same of the connecting sleeve. This combined arrangement of hook shaped projections engaging the wire loops and of gripping projections engaging the covering of the wires ensures practically unseparable and unturnable connection of the two wire loops.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawing, in which:

Figures 1 to 4 show various sheet metal plates for connecting sleeves with partly stamped out plate portions which are to be bent into hook shaped projections;

Figures 5 to 8 show sheet metal plates for connecting sleeves similar to those shown in Figures 1–4 but provided with additional projections along the longitudinal plate edges;

Figure 9 is a side view of a partly finished connecting sleeve made from the sheet metal plate shown in Fig. 5 with bent up hook shaped and gripping projections;

Figures 10 to 12 are cross-sections of three various embodiments of connecting sleeves formed by bending a sheet metal plate of the type shown in Figures 5 and 9 parallel to its longitudinal edges;

Figures 13 to 15 are end views of various embodiments of a connecting sleeve obtained by bending a sheet metal plate in various ways; and Figures 16 and 17 show longitudinal sections of the connecting clamps shown in Figures 10 and 11 along lines 16 and 17 respectively.

The drawings show very clearly the characteristic features of the present invention and therefore no detailed description of every figure separately seems necessary.

According to my present invention the new connecting sleeve consists of a sheet metal plate 20 of the type shown in one of the Figures 1 to 8. Certain portions 21 of this plate are partly stamped out as shown in these figures; these plate portions 21 are then bent up into the shape of hooks and are thus adapted to engage and hook into the wire loops to be firmly connected by the connecting sleeve bent out of the sheet metal plate 20.

As shown in Figs. 1 to 8 these plate portions 21 may be arranged in the most different ways, e. g. within the plate equidistant from its longitudinal edges (Figs. 1 and 5), or reaching to the edges of the plate (Figs. 2 and 6) or along one of the longitudinal edges of the plate extending over the entire length of this edge (Figs. 3 and 7) or finally along one of these edges extending over part of this edge only (Figs. 4 and 8). The common characteristic of all embodiments shown in these figures is that these partly stamped out plate portions 21 are extending parallel to the longitudinal edges of plate 20 and are arranged at a certain distance from each other in such a manner that, if hook shaped projections are bent out of these plate portions 21, these hook shaped projections are positioned with their hook openings facing each other as shown in Figs. 10 to 12.

As shown in Figs. 5 to 8 additional gripping projections 22 might be provided along the longitudinal edges of the plate 20. The purpose of these projections is to enter into the covering 23 of the wires 24 if the same are arranged within the connecting sleeve 25 as shown in Figure 15. In this manner also even the slightest movement of the connected wire loops relative to each other might be prevented.

As shown in Fig. 9 it is possible to arrange these additional projections 22 normal to the plane of plate 20 and to attain thereby that these projections surely enter into the covering of the wires as shown in Fig. 15. In this latter figure it is clearly shown that projections 22 form an angle with the adjacent portions of the connecting sleeve.

Figures 10 to 12 show three finished connecting sleeves according to the present invention in cross-section. From these three figures it might be noted that the hook shaped projections 26 bent from the plate portions 21 may be arranged at different distances from each other: Thus for instance in Fig. 10 the hook tips are contacting each other while in Fig. 11 the end portion of the hook shaped projections are overlapping. Contrary thereto in Fig. 12 the hook tips are a certain distance from each other. It is evident that in the embodiments shown in Figs. 10 and 11 it is necessary to introduce the wire loops into the hooks before final bending while introduction of the loops into the hooks of the embodiment shown in Fig. 12 might be carried out after the hooks are finished.

It should be noted that the hook projections 26 are preferably dimensioned so that after bending of plate 20 into the shape of a sleeve of the type shown in Figs. 10 to 12 the outer diameter of the hook shaped projections 26 is equal to or only slightly smaller than the inner diameter of the sleeve; thus opening of the hook shaped projections 26 by pull of the connected wire loops is practically impossible. Therefore if the hooks are properly dimensioned it is nearly impossible to take apart the connected wire loops without either destroying the connecting sleeve or tearing the wire.

Figs. 13 to 15 show various ways of bending a plate 20 into the shape of a connecting sleeve. As shown in Fig. 13 the longitudinal edge portions of the plate 20 may overlap each other thereby completely enclosing the wires and hooks 26. Contrary thereto in the embodiment shown in Figs. 14 and 15 the longitudinal edge portions of the sleeve do not overlap, but they are turned together with projections 22 into the wire covering for the purpose of ensuring unturnable connection of the wire loops in the way described above.

Figures 16 and 17 are longitudinal sections of two embodiments of my new connecting means clearly showing its use for connecting wire loops. In the embodiment shown in Fig. 16 the tips of the hook projections 26 are contacting each other while in the embodiment shown in Fig. 17 they are overlapping. A characteristic feature of the connecting sleeve shown in Fig. 17 is furthermore that the hook shaped projections 26 are arranged at such distance that the tips of the connected wire loops are contacting each other.

It will be understood that each of the elements described above, or two or more together, may also find a useful application in other types of wire connecting means differing from the type described above.

While I have illustrated and described the invention as embodied in connecting sleeves for connecting wire loops I do not intend to be limited to the details shown, since various modifications and structural changes may be made without departing in any way from the spirit of my invention.

In this connection I would like to stress that the connecting clamps might be made of any material adapted for the purposes of the present invention; thus clamps made of preferably flexible, plastic material are also well adapted as initial material for the clamps.

I would like also to note that although I mentioned only fabric or rubber as covering material for the wires to be connected also other materials are adapted for these purposes.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What I claim as new and desire to secure by Letters Patent is:

1. Connecting clamp for two wire loops comprising a connecting sleeve with openings at both ends through which said wire loops may be introduced into said sleeve in such a manner that the loop tips are facing each other, and projections on said sleeve bent inward into said sleeve in such a manner as to hook into said wire loops, to hold them within said sleeve and to prevent sliding out of the same from said sleeve when said wire loops are introduced into said sleeve and arranged within said sleeve with the loop tips facing each other.

2. Conecting clamp for two wire loops comprising a connecting sleeve with openings at both ends through which said wire loops may be introduced into said sleeve in such a manner that the loop tips are facing each other, said sleeve having sleeve portions bent inward in such a manner as to hook into said wire loops, to hold them within said sleeve and to prevent sliding out of the same from said sleeve when said wire loops are introduced into said sleeve and arranged within said sleeve with the loop tips facing each other.

3. Connecting clamp for two wire loops comprising a connecting sleeve with openings at both ends through which said wire loops may be introduced into said sleeve in such a manner that the loop tips are contacting each other, and projections on said sleeve arranged at a distance from each other which is slightly greater than twice the diameter of the wire forming the wire loops to be connected, said projections being bent inward into said sleeve in such a manner as to hook into said wide loops, to hold them within said sleeve with the loop tips contacting each other and to prevent sliding out of the same from said sleeve.

4. Connecting clamp for two wire loops comprising a connecting sleeve with openings at both ends through which said wire loops may be introduced into said sleeve in such a manner that the loop tips are facing each other, and hook shaped projections on said sleeve bent inward into said sleeve with their end portions overlapping each other in such a manner as to hook into said wire loops, to hold them within said sleeve and to prevent sliding out of the same from said sleeve.

5. Connecting clamp for two wire loops comprising a sheet metal sleeve provided with openings at both ends through which said wire loops may be introduced into said sleeve in such a manner that the loop tips are facing each other, and hook shaped projections on said sleeve integral with the same bent out of the sheet metal of which said sleeve consists inward into said sleeve with the hook openings facing each other and the tips of said hook shaped projections being at such distance from each other as to enable introduction of said wire loops into said hook shaped projections before bending of the sleeve so as to hold said wire loops within said sleeve.

6. Connecting clamp for two wire loops comprising a sheet metal sleeve provided with openings at both ends through which said wire loops may be introduced into said sleeve in such a manner that the loop tips are facing each other, and hook shaped projections on said sleeve integral with the same stamped out of the sheet metal of which said sleeve consists, said projections being arranged in longitudinal direction of said sleve and bent inward into the same with the hook openings facing each other in such a manner as to hook into said wire loops, to hold them within said sleeve and to prevent sliding out of the same from said sleeve.

7. Connecting clamp for two wire loops comprising a metallic sleeve formed by bending a longitudinal sheet metal plate into a longitudinal sleeve having openings at both ends through which said wire loops may be introduced into said sleeve in such a manner that the loop tips are facing each other, and hook shaped projections integral with said sleeve stamped out of the plate of which said sleeve consists and extending along one of the longitudinal edges of said plate, said hook shaped projections being bent inward into said sleeve with the hook openings facing each other in such a manner as to hook into said wire loops, to hold them within said sleeve and to prevent sliding out of the same from said sleeve.

8. Connecting clamp for two U-shaped loops of wire provided with a covering having a relatively rough outer surface and being arranged substantially unturnably about said wires, said connecting clamp consisting of a sheet metal sleeve provided with openings at both ends through which said wire loops may be introduced into said sleeve in such a manner that the loop tips are facing each other, hook shaped projections on said sleeve integral with the same stamped out of the sheet metal of which said sleeve consists, said projections being arranged in longitudinal direction of said sleeve and bent inward into the same, with the hook openings facing each other in such a manner as to hook into said wire loops, and additional projections along the longitudinal edges of said sleeve bent inward into the covering of said wires.

9. For purposes of manufacturing a connecting sleeve for connecting two wire loops, a longitudinal sheet metal plate provided with slits extending in longitudinal direction of said plate in such a manner that said slits form plate portions which are adapted to be bent out of the plane of said plate and form hook shaped projections for hooking into said wire loops to be connected by the sleeve formed by bending said plate about its longitudinal axis so that said wire loops are prevented by said hook shaped projections projecting into the thus formed sleeve from sliding out of the same.

10. For purposes of manufacturing a connecting sleeve for connecting two wire loops, a longitudinal sheet metal plate provided with two U-shaped slits aligned in longitudinal direction of said plate with the openings of said U-shaped slits facing each other in such a manner that said slits form plate portions which might be bent out of the plane of said plate and form hook shaped projections with the hook openings facing each other for hooking into said wire loops to be connected by the sleeve formed by bending said plate about its longitudinal axis so that said wire loops are prevented by said hook shaped projections projecting into the thus formed sleeve from sliding out of the same.

11. For purposes of manufacturing a connecting sleeve for connecting two wire loops, a longitudinal flat sheet metal plate provided with two hook shaped projections bent out of the flat sheet metal of which said flat plate consists with the hook openings facing each other, said hook shaped projections being adapted to hook into the wire loops to be connected by the sleeve formed by bending said flat plate about its longitudinal axis so that said wire loops are prevented by said hook shaped projections projecting into the thus formed sleeve and hooking in said loops from sliding out of the same.

12. For purposes of manufacturing a connecting sleeve for connecting two wire loops, a longtudinal flat sheet metal plate provided with two hook shaped projections bent out of the flat sheet metal of which said flat plate consists with the hook openings facing each other, said hook shaped projections being adapted to hook into the wire loops to be connected, and provided also with projections along the longitudinal edges of said plate, said projections forming an acute or right angle with the plane of said plate.

FRANK S. SANDER.